United States Patent Office 2,809,186
Patented Oct. 8, 1957

2,809,186
NEW POLYOLS FROM POLYALDEHYDES, THEIR PREPARATION AND DERIVATIVES

Curtis William Smith, Berkeley, and Theodore W. Evans, Oakland, Calif., assignors to Shell Development Company, New York, N. Y., a corporation of Delaware No Drawing. Application August 16, 1954,
Serial No. 450,210

14 Claims. (Cl. 260—73)

This invention relates to new polyols, i. e., polyhydroxy compounds, and to their preparation. More particularly, the invention relates to a new class of polyols, to a process for preparing the polyols from polyaldehydes, and to certain valuable derivatives of the polyols.

Specifically, the invention provides new polyols having unexpectedly high functionality, said polyols being prepared by reacting a polyaldehyde with formaldehyde in an amount sufficient to furnish at least 2 moles of formaldehyde per mol of polyaldehyde and preferably at least one mole of formaldehyde for every aldehyde group and for every labile hydrogen on the carbon atom adjacent to the aldehyde group on the polyaldehyde molecule, and then hydrogenatnig the resulting product. The invention further provides valuable derivatives of the above-described polyols and particularly their monomeric and polymeric esters.

It is an object of the invention to provide a new class of polyols. It is a further object to provide new polyols having a high degree of functionality and a process for preparing the polyols from polyaldehydes. It is a further object to provide new polyols having properties which make them particularly useful and valuable in industry. It is a further object to provide new polyols which are particularly useful as lubricants and blending agents. It is a further object to provide new polyols which are particularly valuable in the preparation of modified aikyd resins. It is a further object to provide new polyols which are useful in the preparation of ester plasticizers. Other objects and advantages of the invention will be apparent from the following detailed description thereof.

It has now been discovered that new polyols having an unexpectedly high functionality are obtained by condensing a polyaldehyde with formaldehyde in a mole ratio of at least 1:2 and then hydrogenating the resulting product.

The aldehydes to be used in the preparation of the new polyols comprise those compounds having at least two aldehyde groups, i. e., at least two

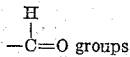

and preferably those having at least one aldehyde group attached to a carbon atom bearing a labile hydrogen atom. These polyaldehydes may be open-chain or cyclic, saturated or unsaturated and may be substituted with various substitutents, such as halogen atoms, alkoxy radicals and the like. Examples of these polyaldehydes include, among others, glutaraldehyde, adipaldehyde, pimelaldehyde, suberaldehyde, glutaconaldehyde, alpha hydroxyadipaldehyde, beta-methoxyadipaldehyde, alpha,-gamma-dimethyl-alpha-(methoxymethyl) glutaraldehyde, beta - allyloxy - pimelaldehyde, 1,4-cyclohexanedicarboxaldehyde, 3 - cyclohexene -1,5 - dicarboxaldehyde, 1,1,5-pentanetricarboxaldehyde and 1,3,6-octanetricarboxaldehyde.

A preferred group of polyaldehydes to be used in the preparation of the new polyols comprise glutaraldehyde and hydrocarbyl-substituted glutaraldehydes, such as those of the formula:

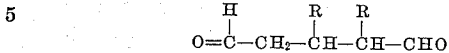

wherein each R is hydrogen or an alkyl, cycloalkyl, alkenyl, cycloalkenyl, aryl, alkaryl or an aralkyl group. Examples of these dialdehydes include beta-methyl-glutaraldehyde, beta,gamma - dibutylglutaraldehyde, beta-phenylglutaraldehyde, beta,gamma - dibenzylglutaraldehyde, beta-allylglutaraldehyde, beta,gamma-dicyclohexyl-glutaraldehyde, and beta-isopropylphenylglutaraldehyde. A detailed description of how to prepare these aldehydes may be found in Smith et al.—U. S. 2,546,018.

Another preferred group of polyaldehydes to be used in preparation of the polyol comprise the ether-substituted dialdehydes, such as those obtained by reacting a suitable alpha-methylene monoaldehyde, such as methacrolein, with an alcohol under controlled conditions and in the presence of a basic condensation catalyst. The overall reaction which is effected in the execution of this process may be exemplified by the following equation:

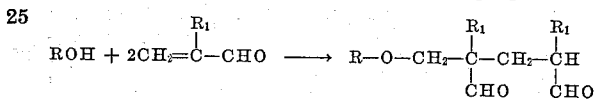

In this equation, ROH signifies an alcohol containing the organic radical R which is preferably a hydrocarbon radical, and $R_1$ represents a hydrocarbon group, preferably an alkyl, cycloalkyl, aryl, alkaryl or aralkyl group. For example when R is allyl and $R_1$ represents methyl, the product is alpha,gamma-dimethyl-alpha-(allyloxymethyl) glutaraldehyde. Other examples of these preferred aldehydes include alpha,gamma-dimethyl-alpha-(methoxymethyl) glutaraldehyde, alpha,gamma-dimethyl-alpha -(propoxymethyl) glutaraldehyde, alpha,gamma-dimethyl - alpha -(hydroxyethoxymethyl) glutaraldehyde, alpha,gamma-dimethyl-alpha-(butoxymethyl) glutaraldehyde, alpha,gamma-diethyl - alpha -(phenoxymethyl) glutaraldehyde, alpha,gamma-dicyclohexyl-alpha-(methallyloxymethyl) glutaraldehyde, alpha,gamma-dibutyl-alpha-(dodecyloxymethyl) glutaraldehyde, and alpha,gamma-dioctyl - alpha - (octadecenyloxymethyl) glutaraldehyde. Especially preferred members of this group are those of the formula:

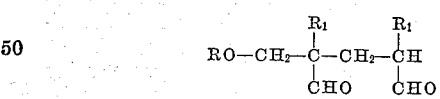

wherein R is a hydrocarbon or hydroxy-substituted hydrocarbon radical, and particularly an alkyl, alkenyl, cycloalkyl or cycloalkenyl radical and their hydroxysubstituted derivatives, and $R_1$ is an alkyl, alkenyl, cycloalkyl or cycloalkenyl radical, wherein all of the foregoing radicals preferably contain no more than 8 carbon atoms. A detailed description of the method for preparing the above-described preferred polyaldehydes may be found in copending patent application of Smith and Norton, Serial No. 16,617, filed March 23, 1948, now Patent No. 2,702,823.

Another preferred group of polyaldehydes to be used in preparing the polyols of the present invention comprise the hydroxy-substituted dialdehydes and particularly the alpha-hydroxy-substituted adipaldehydes, such as, for example, alpha - hydroxyadipaldehyde, alpha - hydroxy-gamma, delta-dimethyladipaldehyde, alpha-hydroxy-gamma-ethyl-delta-isopropyl-adipaldehyde, and alpha-hydoxy-gamma-delta-dioctyladipaldehyde. A detailed description for preparing some of these polyaldehydes from substituted dihydro-1,4-pyrans may be found in Whetstone et al.—U. S. 2,639,297.

Another group of preferred polyaldehydes to be used in the preparation of the new polyols comprise those obtained by condensation of methacrolein in the presence of aqueous alkali as described in J. Am. Chem. Soc. 60, 1737 and 1911 (1938), and polyaldehydes obtained by condensing acrolein with alcohols in the presence of a basic catalyst as described in German Patent 554,949.

Still another group of preferred polyaldehydes to be used in the preparation of the polyols of the invention comprise the polymers and copolymers obtained by polymerizing unsaturated aldehydes. Examples of such unsaturated aldehydes include, among others, acrolein, alpha-methyl acrolein, alpha-ethyl acrolein, alpha-propyl acrolein, alpha-isobutyl acrolein, alpha-n-amyl acrolein, alpha-n-hexyl acrolein, alpha-bromo acrolein, crotonaldehyde, alpha-chlorocrotonaldehyde, alpha-bromo-crotonaldehyde, alpha-beta-dimethylacrolein, alpha-methyl-beta-ethyl acrolein, alpha-ethyl-beta-propylacrolein, and the like. Preferred unsaturated aldehydes to be used in preparing these polymers include the alpha,beta-ethylenically unsaturated aldehydes, and particularly the 2-alkenals containing no more than 8 carbon atoms.

Monomers that can be copolymerized with the above-described unsaturated aldehydes to form polyaldehydes comprise those compounds containing a polymerizable unsaturated linkage, and preferably a single $CH_2=C=$ group, such as, for example, styrene, alpha-methyl styrene, vinyl chloride, vinylidene chloride, methyl methacrylate, ethyl acrylate, acrylonitrile, methacrylonitrile, allyl acetate, vinyl acetate, chloroallyl caproate, allyl alcohol, isobutylene, allyl glycidyl ether, vinyl methyl ether, allyl glycolate, methyl allyloxy-acetate, vinyl pyridine, glycidyl methacrylate, hydroxyethyl methacrylate, octyl acrylate, vinyl pyrollidone, allyl dimethyl cyanurate, allyl butyl phthalate, dialkyl maleates, and the like. In preparing copolymers of the unsaturated aldehydes with these dissimilar monomers it is preferred to employ the dissimilar monomer in amounts varying from 1% to 70% by weight of the total monomer mixture.

The polymerization may be accomplished by treating the monomer composition containing the unsaturated aldehyde and, if desired, a dissimilar monomer, with an initiator which generates free radicals, such as peroxide and azo-type initiators. Specific peroxides which can be used include dialkyl peroxides, e. g., di-t-amyl peroxide; alkyl hydro peroxides, e. g., t-butyl hydroperoxide; and diacyl peroxides, e. g., benzoyl peroxide, acetyl peroxide and acetyl benzoyl peroxide. Specific azo compounds which can be used include alpha,alpha'-azodiisobutyramide, 1,1'-azodicyclohexanecarbonitrile and alpha, alpha'-azobis(alpha,gamma-dimethylvaleronitrile). These catalysts are preferably employed in amounts varying from about 0.1% to 10% by weight of the material being polymerized and more preferably from 1% to 5% by weight.

The polymerization may be effected over a wide range of temperatures depending upon the catalyst selected and the desired molecular weight of the polymer. If one desires very low molecular weight products, one should select a higher reaction temperature, such as of the order of 100° C. to 250° C., and select a catalyst that has a satisfactory decomposition rate within that range of temperature. If the higher molecular weight products are desired, one may select the lower range of temperature, such as, for example, 50° C. to 100° C., and select a catalyst having a decomposition rate within that range. In general, it is preferred to employ temperatures within the range of 80° C to 200° C., and catalysts that will be effective within that range.

The polymerization may be conducted in bulk, solvent solution or aqueous emulsion or system. The polymerization is preferably conducted, however, in bulk or in the presence or absence of solvents, such as ethanol, butanol, dioxane, acetonitrile, isopropyl ether, and the like, and mixtures thereof.

After the polymerization has been accomplished, the polymeric polyaldehydes may be recovered from the reaction mixture by any suitable means, such as distillation, filtration, extraction and the like.

The new polyols are obtained by condensing one or more of the above-described polyaldehydes with formaldehyde and then hydrogenating the resulting product. The formaldehyde used in this reaction may be employed as such or one may employ materials that liberate formaldehyde, such as trioxane (trimer of formaldehyde), paraformaldehyde, and the like. The formaldehyde may also be used in admixture with other monoaldehydes, such as acetaldehyde, propionaldehyde and the like.

The polyaldehyde and formaldehyde should be combined in a mole ratio of at least 1:2. For best results, however, there should be employed at least one mole of formaldehyde for every aldehyde group present on the polyaldehyde molecule and for every hydrogen attached to the carbon atoms adjacent to the aldehyde groups. Thus, in the reaction with dialdehydes, such as glutaraldehyde, one should, for best results, employ at least 6 moles of formaldehyde for every mole of the dialdehyde, and with substituted dialdehydes, such as alpha-hydroxyaldipaldehyde, one should employ at least 5 moles of formaldehyde for every mole of the dialdehyde.

Alkaline catalysts are preferably utilized to effect the desired condensation. Such materials include the alkali metal hydroxide, such as sodium and potassium hydroxide, the alkaline earth metal hydroxides and oxides, such as calcium oxide, calcium hydroxide, magnesium hydroxide, barium hydroxide, organic amines, such as triethyl amine, pyridine, and the like. The amount of the catalyst employed will vary preferably from about .1 mole to .8 mole per mole of the polyaldehyde, and more preferably from .5 mole to .75 mole per mole of the polyaldehyde.

The temperature employed in the condensation reaction may vary over a considerable range. In general, the temperature will range from about 10° C. to 150° C. Preferred temperatures range from about 40° C. to 100° C. The reaction is preferably conducted at atmospheric pressure, but superatmospheric or subatmospheric pressures may be employed as desired or necessary.

The condensation may be conducted with or without the use of solvent or diluents. Preferred solvents include water and various organic materials in which the polyaldehydes may be soluble, such as ethanol, methanol, dioxane, butanol, methyl butyl ether, dimethyl ether of ethylene glycol, benzyl alcohol, chloroform, and the like.

After the condensation reaction has been completed, the reaction mixture is then treated to remove the catalyst and recover the condensation product. The catalyst may be removed by any suitable means, such as by precipitation with an acid as oxalic or sulfuric acid. The condensation product may then be recovered by distillation, precipitation, and the like.

The condensation products produced by the above process are viscous liquids to solids at room temperature. The products have a relatively high hydroxyl value and, if desired, may be used as polyol of low functionality. The desired superior polyols having high functionality are obtained from these products, however, only by subsequent hydrogenation.

The hydrogenation is accomplished by treating the condensation product with hydrogen at a temperature between 130° C. and 300° C., and an elevated pressure in the presence of certain hydrogenation catalysts. The process may be executed in the presence or absence of diluents and solvents, but for best results it is usually desirable to employ inert diluents, such as ethanol, isopropanol, ethylene glycol, dioxane, and the like and mixtures thereof.

Hydrogenation catalysts that may be used include, among others, the heavy metals of groups I, II and IV to VIII of the periodic table of elements, mixtures of these metals, their alloys and derivatives as their sulfides, oxides and chromites, such as silver, copper, iron manganese, molybdenum, nickel, palladium, platinum, chromium, cobalt, rhodium, tungsten, mixtures of the metals, such as copper-silver mixtures, copper-chromium mixtures, nickel-cobalt mixtures and their derivatives such as copper oxide, copper chromite, nickel sulfide, silver sulfide, and the like. Particularly preferred catalysts are the members of the group consisting of nickel, copper, cobalt, iron chromium, silver and platinum, and their oxides, sulfides and chromites. These catalysts may be employed in a finely-divided form and dispersed in and throughout the reaction mixtures, or they may be employed in a more massive state, either in essentially the pure state or supported upon or carried by an inert carrier material, such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range. In general, the amount of the catalyst will vary from 1% to 30% by weight of the reactants. Preferred amounts of catalyst range from 1% to 25% by weight. The above-described preferred catalysts are generally employed in amounts varying from 1% to 20% by weight.

Temperatures used during the hydrogenation will generally vary from above 130° C. to about 300° C. Particularly preferred temperatures range from 100° C. to 250° C. Hydrogen pressure of 250 pounds per square inch are effective, but higher pressures of the order of about 500 to 8000 p. s. i. are generally more preferred. Particularly preferred hydrogen pressures range from about 1000 p. s. i. to 5000 p. s. i.

At the conclusion of the hydrogenation treatment, the polyols may be recovered directly from the reaction mixture by any suitable manner. For example, the hydrogenation catalyst, if dispersed in the reaction mixture, may be removed by filtration or centrifugation and the polyols recovered by distillation, solvent extraction, crystallization or other known methods.

The polyols prepared by the above process are viscous liquids to solids at room temperature. If solid, they have low melting points and can be converted to liquids at temperatures generally below about 100° C. All of the polyols have a high degree of functionality and preferably have at least four to six hydroxyl groups. The polyols are valuable as humectants, as softening agents for casein and other protein plastics, as textile lubricants, as lubricating oil additives and as blending agents for dyes, inks and paints. They are also useful as valuable intermediates in the preparation of emulsifying agents, surface active agents, adhesives, herbicides, fungicides, insecticides and tackifying and softening agents for natural and synthetic rubbers.

The polyols are particularly valuable, however, in the preparation of modified alkyd resins. The polyols impart faster drying and baking characteristics and produce films having greater hardness and flexibility.

The polycarboxylic acids which may be reacted with the novel polyols to prepare the above-described alkyd resins may be of any suitable type. They may be saturated, unsaturated, cyclic, aromatic and may possess two, three or more carboxyl groups. Examples of these acids include, among others, phthalic acid, isophthalic acid, terephthalic acid, tetrachlorophthalic acid, glutaric acid, adipic acid, diglycolic acid, succinic acid, pimelic acid, suberic acid, cyclohexanedicarboxylic acid, maleic acid, fumaric acid, itaconic acid, 1,8-naphthalenic acid, and the like. Preferred polycarboxylic acids to be used in producing the alkyds comprise the unsubstituted dicarboxylic acids containing no more than 16 carbon atoms, such as, for example, the alkanedioic, cycloalkanedioic acid, alkenedioic, cycloalkenedioic acid, aromatic hydrocarbon dicarboxylic acids and the alkyl-substituted aromatic hydrocarbon dicarboxylic acids.

The modifying agents employed in producing the above-described alkyds comprising monohydric alcohols, as allyl alcohol, butyl alcohol, and octyl alcohol, monocarboxylic acids, such as, for example, butyric acid, capric acid, cyclohexanecarboxylic acid, chlorobutyric acid, benzoic acid, p-tert-butylbenzoic acid, 3,5-di-tert-butylbenzoic acid, chlorobenzoic acid, fatty acids derived from natural oils, as drying oils, semi-drying oils and non-drying oils, such as linseed, soybean, perilla, tung, walnut, pineseed, olive, oiticica, corn cottonseed, cocoanut, hemp seed, herring, poppy seed, mustard, peanut, rapeseed, salmon, dehydrated castor oil, rubber seed, safflower, and the like, and mixtures thereof. Particularly modifiers comprise the non-drying oil, semi-drying oil and drying oil fatty acids, and particularly those derived from dehydrated castor oil, soybean oil, linseed oil, cocoanut oil, safflower oil and oiticica oil.

The alkyd resins are preferably prepared by heating the polyol with the polycarboxylic acid (or its anhydride) and the modifiers together, preferably in an inert atmosphere. Ordinarily, no catalyst need be employed to effect this reaction, but, if desired, substances as p-toluenesulfonic acid, zinc chloride, stannic chloride, calcium acetate, barium acetate, and the like, in amounts varying from about 0.1% to 5% by weight of reactants may be employed.

The proportions of reactants to be used in preparing the alkyds may vary depending upon the properties desired in the finished product. Ordinarily, the polycarboxylic acid or anhydride will be reacted with at least a chemical equivalent amount of the polyol and satisfactory results are obtained when up to 50% excess of the polyol is employed. A "chemical equivalent amount" as used herein in this regard refers to that amount of alcohol needed to furnish one OH group for every carboxyl group. In order to obtain superior alkyds, one preferably reacts the acid or anhydride with an excess up to 40% excess of the polyol.

The amount of the modifier to be combined with the polycarboxylic acid or anhydride and polyol will vary over a wide range depending on the type selected and the product desired. Generally, the amount of the modifier will vary from 20% to 80% by weight of the resinous product, with a preferred range of proportions varying from 30% to 70% by weight of the resin.

The temperature employed during the resin-forming reaction may vary over a considerable range depending upon the type of reactants, catalyst, etc. In most cases, the temperature will range between about 100° C. and 250° C., with a preferred range of between 200° C. to 230° C.

The alkyd formation may be accomplished in the presence or absence of diluents. If solvents and diluents are employed, it is desirable to utilize inert organic compounds, such as benzene, toluene, xylene, cyclohexane, and the like, and mixtures thereof.

It is preferred to accomplish the preparation of the alkyd resins under a blanket of an inert gas, at least during the initial stages of the reaction. By an inert gas is meant one substantially devoid of molecular oxygen, such as nitrogen, carbon dioxide, helium, methane, and the like.

When the reaction is substantially complete, the inert solvents or diluents, remaining water and uncombined reactants are preferably removed from the reaction mixture. Removal is conveniently accomplished by vacuum distillation, although fractional distillation, precipitation, may also be utilized.

The alkyds prepared from the new polyols are particularly valuable in the preparation of air-drying or baking coating compositions. For this application, they may be combined with various coating solvents or oils or may be added to compositions containing film-forming components such as vinyl polymers, aminoplast resins, cellulose ethers and esters and the like. The oil-modified alkyds are particularly useful in the preparation of baking lacquers and enamels. In this case they are preferably combined with urea-formaldehyde or melamine-formaldehyde resins and other desired components, such as pigments, plasticizers, stabilizers, and the like, and the mixture then diluted with solvents or diluents to provide a composition having the desired viscosity. The composition may then be applied to the desired surface and baked at temperatures generally varying from 100° C. to 175° C. The resulting baked films are very hard and have good flexibility.

The new polyols of the present invention may also be used to produce valuable monomeric esters and ethers. The esters of the polyols and monocarboxylic acids or acid esters of polycarboxylic acids are especially useful as plasticizers for vinyl polymers, and particularly the vinyl halide polymers, as they are compatible therewith and form very hard flexible films. The monocarboxylic acids used in producing such esters may be exemplified by butyric acid, hexanoic acid, caprylic acid, pelargonic acid, capric acid, lauric acid, palmitic acid, stearic acid, arachidic acid, sorbic acid, acrylic acid, methacrylic acid, crotonic acid, alphachloroacrylic acid, cyclohexanecarboxylic acid, toluic acid, methylbenzoic acid, nonylbenzoic acid, oleic acid, and the like and mixtures thereof. Mixed esters wherein one of the monocarboxylic acids is in aromatic acid and the other acid or acids is an aliphatic open-chain fatty acid are particularly good plasticizers for the vinyl halide polymers. The esters of the polyols and the unsaturated acids, such as acrylic acid and methacrylic acid, or the esters of the polyols and acid esters of polycarboxylic acids and unsaturated alcohols, such as allyl hydrogen maleate, are valuable as polymerizable plasticizers for the vinyl halide polymers as they may be mixed with vinyl halide polymers and a free radical yielding catalyst, such as a peroxide catalyst, and the combination then heated to effect polymerization. The product prepared in this monomer are very hard and tough but still highly flexible. The products plasticized in this monomer are useful in preparation of floor tile, seat covers, draperies and the like.

The new polyols may also be used to produce polyepoxy ethers which are valuable in the formation of pottings and castings. This may be accomplished by reacting the polyol with an epoxy-halo-substituted alkane or dihalo-hydroxy-substituted alkane to form a polyether halohydrogen and then treating that product with a dehydrohalogenating agent, such as sodium aluminate, to form the corresponding polyepoxy ether.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the following examples are parts by weight.

*Example I*

This example illustrates the preparation and properties of a polyol from alpha-hydroxyadipaldehyde and formaldehyde.

56 parts of acrolein dimer (.5 mole) was added to 1000 parts of water and .3 part concentrated sulfuric acid. This mixture was stirred at room temperature for 30 minutes. To this solution of alphahydroxyadipaldehyde was added without further treatment, 147 parts (2.35 mole) of paraformaldehyde. Calcium oxide 33.5 parts (0.59 mole) was added portionwise over a 20 minute period. The solution was then warmed to 40° C., and stirred for 2 hours at this temperature and then heated to, and maintained at 50° C., for 2 hours. The calcium formate was removed by filtration and a slight excess of sulfuric acid was added to complete removal of calcium as calcium sulfate. Filtered and filtrate passed over basic ion-exchange resin to remove excess acid. The filtrate was then treated with charcoal. Solvents were removed by distillation at reduced pressure finally at 80° C. (1 mm.). The residue 120 parts of a light colored syrup was viscous at 100° C., but solid at lower temperatures. The solid had the following analysis:

Ester value=0.34 eq./100 g.
Carbonyl (free and combined)=0.125 eq./100 g.
C=46.07
H=7.41
OH=1.45 eq./100 g.

60 parts of the solid produced above was mixed with 175 parts of water and exposed to hydrogen under 3000 p. s. i. at 200° C., in the presence of Raney nickel. In 6 hours .75 mole of hydrogen was absorbed. The nickel was removed by filtration and the filtrate concentrated under reduced pressure to yield a water white syrup. This product had a 2.47 eq./100 g. OH value.

The polyol produced by the above process can be used to produce valuable modified alkyd as shown by the following experiment. 148 parts of phthalic anhydride, 300 parts of the polyol and 225 parts of dehydrated castor oil are placed in a reaction flask equipped with a stainless steel stirrer, nitrogen bubbler, thermometer and phase separating condenser. Xylene is used to remove the formed water azeotropically. The charge is brought to a cooking temperature of 230° C., and held at that temperature for several hours. The resulting product is a light brown resin having an acid number below 10.

A white baking enamel is prepared by combining 100 parts of titanium dioxide, 75 parts of the alkyd prepared above and 25 parts of a urea-formaldehyde resin (Beetle 227–8) and adding xylene to obtain the desired viscosity. This enamel is then sprayed on steel panels to form a film having thickness of 1 to 1.5 mils. These panels are then baked for 12 minutes at 165° C. The resulting films are very hard and flexible.

A polyol having related properties is obtained by replacing the hydroxyadipaldehyde in the above preparation process with equivalent amounts of a hydroxypolyaldehyde obtained by condensing methacrolein in the presence of 4% aqueous NaOH as described in J. Am. Chem. Soc. 60, 1737 (1938).

*Example II*

This example illustrates the preparation and properties of a polyol from glutaraldehyde and formaldehyde.

114 parts of 2-(3,4-dihydro-1,2-pyranyl) methyl ether was combined with 114 parts of water and the mix placed in a reaction vessel equipped with a water-cooled reflux condenser. The mixture was then heated to boiling (about 95° C.) with total reflux condensation for about 8 hours. To the resulting solution of glutaraldehyde was added without further treatment 180 parts of paraformaldehyde. Calcium oxide 33.5 parts was added portionwise over a 20 minute period. This solution was warmed to 40° C., and stirred for 2 hours at this temperature and then heated to and maintained at 50° C. for 2 hours. The calcium formate was removed by filtration and sulfuric acid added to assist in removing calcium as calcium sulfate. Filtered and filtrate passed over ion-exchange resin. The filtrate was then treated with charcoal and distilled under reduced pressure. The resulting product was a light brown viscous syrup having the following analysis:

C—41.96
H—6.85
OH—1.66 eq./100 g.
Ester, 0.41 eq./100 g.
Carbonyl (free and combined), 0.03

50 parts of the brown syrup was mixed with 175 parts of water and exposed to hydrogen under 3000 p. s. i. at 200° C., in the presence of Raney nickel. In 6 hours .9 mole of hydrogen was absorbed. The nickel was removed by filtration and the filtrate concentrated under reduced pressure to yield a water white syrup. This product had an OH value of 1.76 eq./100 g.

The polyol produced by the above process can also be used to produce valuable modified alkyd resins as shown by the following experiment. 148 parts of phthalic anhydride, 300 parts of the polyol produced above and 230 parts of cocoanut oil fatty acids are placed in the reaction flask shown in Example I with toluene as the azeotrope former. The charge is brought to a cooking temperature of 230° C., and held at that temperature for several hours. The resulting product is a light resinous solid.

A clear coating lacquer is prepared by combining 40 parts of the alkyd produced above with 60 parts of benzoquanamine-formaldehyde resin (Uformite MX–61) and adding toluene to obtain the desired viscosity. The resulting lacquer is then flowed out on tin plate panels to form a film of 1 to 1.5 thickness. These panels are then baked for 30 minutes at 150° C. The resulting films are very hard and have good flexibility and impact resistance.

Polyols having related properties are obtained by replacing the glutaraldehyde in the above-described preparation process by equivalent amounts of each of the following: 1,6-hexanedial, 1,8-octanedial and 2 methoxy-1,8-octanedial.

*Example III*

This example illustrates the preparation of a polyol from alpha,gamma-dimethyl-alpha-allyloxymethylglutaraldehyde and formaldehyde and some of the properties of the resulting polyol.

A solution 43 parts (1.07 moles) of sodium hydroxide in 200 parts of water was added dropwise with stirirng to a solution of 86 parts (0.435 mole) of alpha,gamma-dimethyl - alpha - allyloxymethylglutaraldehyde and 144 parts (33.5%, 1.695 moles) for formalin in 300 ml., of methanol at 15° C. The temperature was allowed to increase to room temperature during the addition of the latter half of the sodium hydroxide, after which the mixture was heated to 45° C., for one hour. The addition of carbon dioxide to the reaction mixture caused the separation of a large amount of salt which was removed by filtration. The filtrate was concentrated to a viscous mass from which more water was removed by azeotroping with benzene. When no more water distilled, the benzene solution in the kettle was separated from the salt by filtration. The benzene was removed from the filtrate under reduced pressure and the residue was evacuated finally at 100° C. (0.5 mm.), for one hour. The residue was 50 parts of a light brown viscous syrup.

The brown syrup produced as shown above is mixed with 175 parts of water and exposed to hydrogen under 3000 p. s. i. at 200° C., in the presence of Raney nickel. After .7 mole of hydrogen is absorbed, the nickel is removed by filtration and the filtrate concentrated under reduced pressure to yield a water white syrup which had a high hydroxyl value.

The polyol produced above can be used to produce a modified alkyd resin as shown by the following. 148 parts of phthalic anhydride, 310 parts of the polyol and 225 parts of castor oil fatty acids are placed in a reaction flask described in Example I. Xylene is used to remove the formed water azeotropically. The charge is brought to a cooking temperature of 230° C., and held at that temperature for several hours. The resulting product is a light brown resin having an acid number below 10.

A clear lacquer composition is prepared by combining 60 parts of the alkyd produced above and 40 parts of a urea-formaldehyde resin (Beetle 227–8) and adding toluene to obtain the desired viscosity. This lacquer is then flowed out on tin panels to form a film having thickness of 1 mil. These panels are then baked for 30 minutes at 150° C. The resulting films are hard and have good flexibility.

Polyols having related properties are obtained by replacing the alpha,gamma-dimethyl-alpha-allyloxymethylglutaraldehyde in the above preparation process with equivalent amounts of each of the following: alpha, gamma-dimethyl - alpha - hydroxyethoxymethylglutaraldehyde, alpha,gamma-dimethyl - alpha - dodecyloxymethylglutaraldehyde and alpha,gamma - dimethyl-alpha-cyclohexyloxymethylglutaraldehyde.

*Example IV*

This example illustrates the preparation of a polyol from an acrolein - alpha - methylstyrene copolymer and formaldehyde.

A solution of 69 parts of alpha-methylstyrene, 30 parts of acrolein and 1 part of di-tertiary-butyl peroxide was heated at reflux temperature for 24 hours. Removal of the unreacted materials by reduced pressure distillation gave 21 parts of solid copolymer resin having carbonyl value of 0.55 equivalents per 100 grams and a moleclular weight of 765.

Five parts of the resulting copolymer was dissolved in a mixture of 15 parts of ethanol and 15 parts of pyridine, and then reacted with 6 parts of paraformaldehyde in the presence of 0.5 part of sodium hydroxide. The reaction was carried out with stirring at 70–85° C., for 2 hours. The formed resin was precipitated from the reaction solution by pouring the solution into water and filtering the resin therefrom. The dried resin was a solid having a hydroxyl value of 0.23 eq./100 g.

50 parts of the above resin is mixed with 175 parts of water and alcohol and exposed to hydrogen under 3000 p. s. i. at 200° C., in the presence of Raney nickel. The nickel is removed by filtration and the filtrate concentrated under reduced pressure to yield a solid polyol having a very high OH content.

This polyol is reacted with phthalic anhydride and castor oil fatty acids by the method shown in the preceding example to produce a modified alkyd resin which is useful in the preparation of baking enamels.

We claim as our invention:

1. A process for preparing polyols which comprises mixing a polyaldehyde having at least two aldehyde groups one of which is joined to a carbon atom bearing a replaceable hydrogen atom and being selected from the group consisting of alpha-hydroxyadipaldehydes, addition polymers of alpha,beta-ethylenically unsaturated aldehydes, dialdehydes of the formula

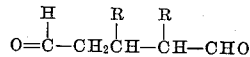

wherein R is a member of the group consisting of hydrogen and alkyl radicals and dialdehydes of the formula

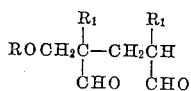

wherein R and $R_1$ are hydrocarbon radicals, with formaldehyde in a mole ratio of at least 3 mols of formaldehyde per mole of the polyaldehyde in the presence of an alkaline condensation catalyst at a temperature between 10° C. and 150° C. and reacting the resulting condensation product with hydrogen at a temperature of 130° C. and 300° C. and a pressure of 250 to 8000 p. s. i. in the presence of a hydrogenation catalyst.

2. A process as in claim 1 wherein the polyaldehyde is an aliphatic dialdehyde containing no more than 12 carbon atoms.

3. A process as in claim 1 wherein the polyaldehyde is an acrolein polymer.

4. A process as in claim 1 wherein the polyaldehyde and formaldehyde are combined so as to have one mole of formaldehyde for every aldehyde group and every labile hydrogenation on the carbon atom adjacent to the aldehyde groups.

5. A process as in claim 1 wherein the polyaldehyde is glutaraldehyde.

6. A process as in claim 1 wherein the polyaldehyde is an alkoxymethyl-substituted glutaraldehyde.

7. A process for preparing polyols which comprises mixing an aliphatic dialdehyde having two aldehyde groups both of which are joined to carbon atoms bearing a replaceable hydrogen atom and being selected from the group consisting of alpha-hydroxyadipaldehydes, addition polymers of alpha,beta-ethylenically unsaturated aldehydes, dialdehydes of the formula

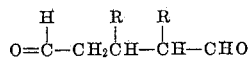

wherein R is a member of the group consisting of hydrogen and alkyl radicals and dialdehydes of the formula

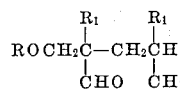

wherein R and R₁ are hydrocarbon radicals, with formaldehyde in a mole ratio between 1(polyaldehyde): 3(formaldehyde) and 1(polyaldehyde):10(formaldehyde) in the presence of an alkaline condensation catalyst at a temperature between 10° C. and 150° C. and treating the resulting condensation product with hydrogen at a temperature between 130° C. and 300° C., and a pressure between 500 and 5000 p. s. i. in the presence of a hydrogenation catalyst.

8. A process as in claim 7 wherein the dialdehyde is alpha-hydroxyadipaldehyde.

9. A process as in claim 7 wherein the dialdehyde is glutaraldehyde.

10. A polyol prepared by the process of claim 1.
11. A polyol prepared by the process of claim 5.
12. A polyol prepared by the process of claim 6.
13. A polyol prepared by the process of claim 8.

14. A process for preparing polyols which comprises mixing a polyaldehyde having at least two aldehyde groups one of which is jointed to a carbon atom bearing a replaceable hydrogen atom and being selected from the group consisting of alpha-hydroxyadipaldehydes, addition polymers of alpha,beta-ethylenically unsaturated aldehydes, dialdehydes of the formula

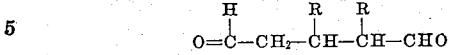

wherein R is a member of the group consisting of hydrogen and alkyl radicals and dialdehydes of the formula

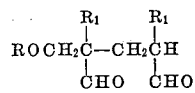

wherein R and R₁ are hydrocarbon radicals, with formaldehydes in a mole ratio of at least 3 mols of formaldehyde per mole of the polyaldehyde in the presence of an alkaline condensation catalyst at a temperature between 10° C. and 150° C.

References Cited in the file of this patent

UNITED STATES PATENTS

| | | |
|---|---|---|
| 1,878,040 | Voss | Sept. 20, 1932 |
| 2,105,284 | Groll et al. | Jan. 11, 1932 |
| 2,150,137 | Swallen | Mar. 7, 1939 |
| 2,162,616 | Hermann et al. | June 13, 1939 |
| 2,178,523 | Schmidt et al. | Oct. 31, 1939 |
| 2,264,034 | Allen | Nov. 25, 1941 |
| 2,317,456 | Hanford et al. | Apr. 27, 1943 |
| 2,389,347 | Dreyfus | Nov. 20, 1945 |
| 2,400,724 | Walker | May 21, 1946 |
| 2,418,290 | Bruson et al. | Apr. 1, 1947 |
| 2,451,333 | Gresham et al. | Oct. 12, 1948 |
| 2,546,018 | Smith | Mar. 20, 1951 |
| 2,662,069 | Kass | Dec. 8, 1953 |
| 2,691,006 | Flory | Oct. 5, 1954 |
| 2,694,077 | Stansbury et al. | Nov. 9, 1954 |

OTHER REFERENCES

Degering: Outline of Organic Chemistry (6th ed.), Barnes and Noble, N. Y.; page 58.

McLeod: American Chemical Journal, vol. 37 (1907), pp. 35–6.

Fuson: Advanced Organic Chemistry, Wiley & Sons, London, 1950; pp. 438–9, 451–2.